United States Patent [19]
Carroll et al.

[11] Patent Number: 6,005,828
[45] Date of Patent: Dec. 21, 1999

[54] ACOUSTIC POSITIONING OF SEISMIC OCEAN BOTTOM CABLE

[75] Inventors: Paul Ellington Carroll, Houston; Roy Wilson James, III, Katy; Eugene David Bednar, Stafford; Charles Geoffrey Rice, Sugar Land; Kent A. Byerly, Seabrook, all of Tex.

[73] Assignee: Input/Output, Inc., Stafford, Tex.

[21] Appl. No.: 08/963,676

[22] Filed: Oct. 31, 1997

[51] Int. Cl.⁶ ........................................ G01V 1/40
[52] U.S. Cl. ........................ 367/19; 367/106; 118/110
[58] Field of Search .................... 367/19, 106, 99, 367/18, 20, 118, 154, 153, 76, 80, 130, 15, 7 R, 14; 118/110

[56] References Cited

U.S. PATENT DOCUMENTS

| | | | |
|---|---|---|---|
| 4,134,097 | 1/1979 | Cowles | 340/7 R |
| 4,405,036 | 9/1983 | Wener et al. | 181/110 |
| 4,446,538 | 5/1984 | Zachariadis | 367/19 |
| 4,558,437 | 12/1985 | Meeder et al. | 367/15 |
| 4,641,287 | 2/1987 | Neeley | 367/19 |
| 5,166,905 | 11/1992 | Currie | 367/19 |
| 5,668,775 | 9/1997 | Hatteland | 367/19 |

*Primary Examiner*—Christine Oda
*Assistant Examiner*—Anthony Jolly
*Attorney, Agent, or Firm*—Haynes and Boone, LLP; Tim Headley; Todd Mattingly

[57] ABSTRACT

A seismic ocean bottom positioning device include a series of seismic stations spaced apart at a predetermined interval along a cable. Each station includes a hydrophone, a motion sensing device such as a geophone and an acoustic positioning circuit. A preamplifier is coupled to a seismic channel. The hydrophone is also coupled to the seismic channel. An acoustic channel is also coupled to the preamplifier and coupled to the hydrophone.

11 Claims, 1 Drawing Sheet

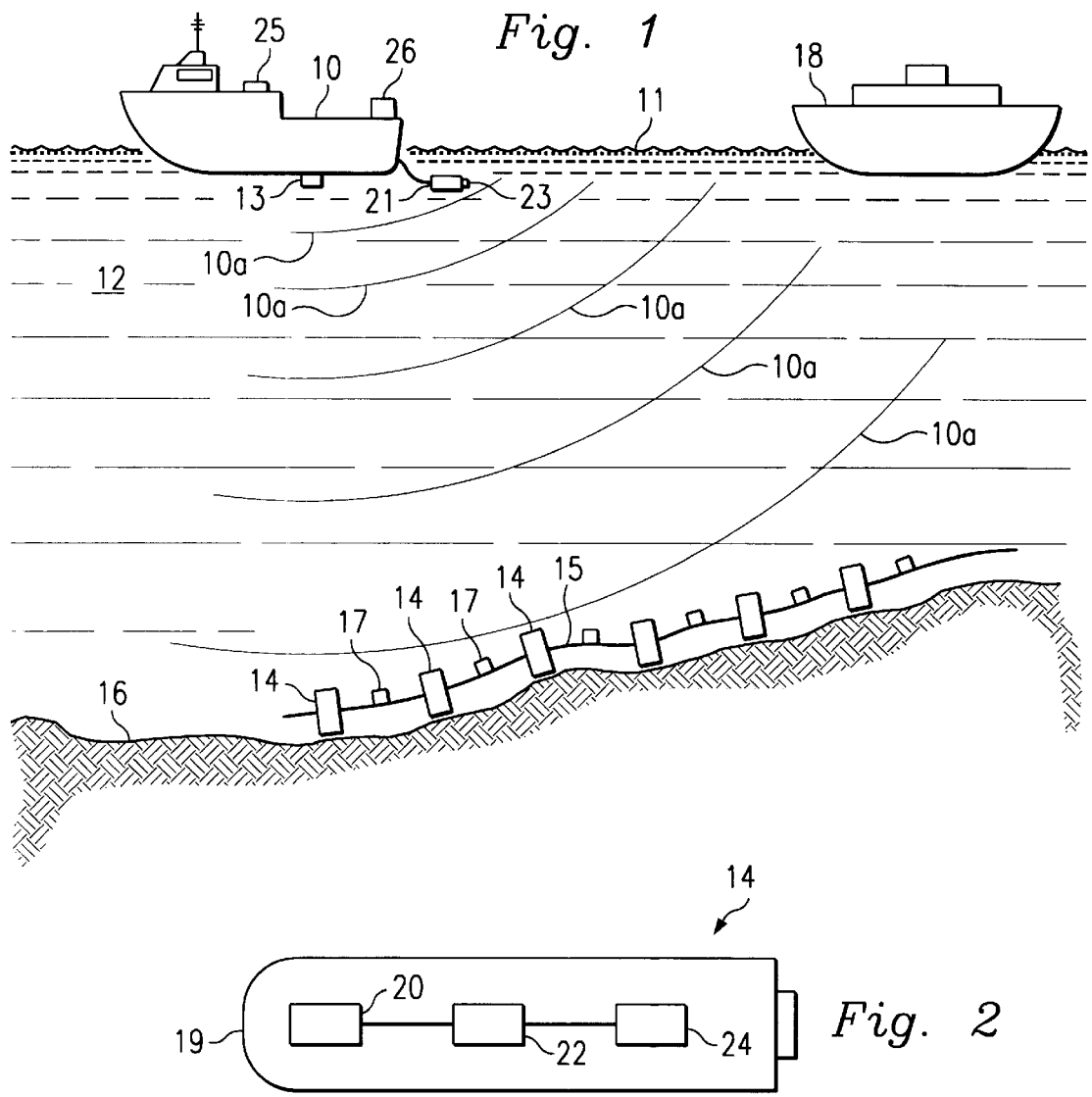
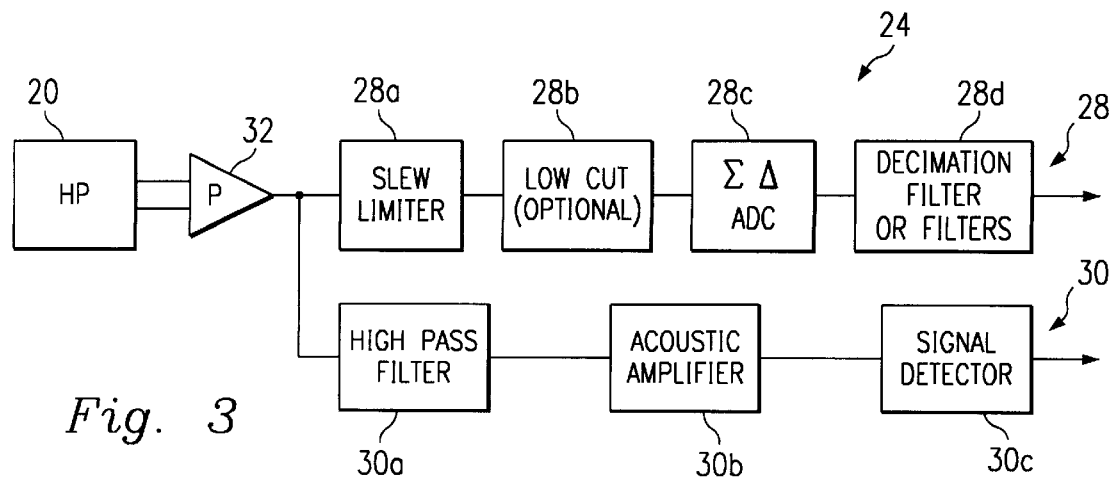

ACOUSTIC POSITIONING OF SEISMIC OCEAN BOTTOM CABLE

BACKGROUND

The disclosures herein relate generally to seismic ocean bottom cables and more particularly to locating the position of each hydrophone on the ocean bottom.

One of the problems in seismic under-sea exploration is to locate the receivers (hydrophones and or geophones) on the ocean bottom with respect to a source of sound. The source of sound is located with respect to an electronic navigation system. The most commonly used navigation system is the differential GPS (Global Positioning System) using satellites.

Existing systems now use an additional acoustic positioning system to locate a towed cable and receivers (hydrophones). These systems usually do not have an acoustic sensor at each hydrophone seismic sensor. The frequency used is in the range of 30 KHz to above 100 KHz. A related problem in bottom cable exploration is that if the sensor sinks into the mud at the ocean bottom, the high frequency acoustic source may not penetrate the mud and may not work.

One such system is described in U.S. Pat. No. 5,668,775 which includes seismic equipment arranged to transmit and receive signals. The equipment is included in streamers as part of a marine seismic tow. Furthermore, the equipment uses several acoustic transmitters and operates with acoustic receivers separated by a known distance. Also, the location of at least one point in a spatial network is defined by relating the network to at least one conventionally determined geographical position.

Therefore, what is needed is a method and apparatus for determining the position of seismic equipment placed on the ocean bottom rather than being towed behind a boat such that the cables are in a fixed position on the ocean bottom and a recording boat is maintained in position by anchoring or by directional thrusters.

SUMMARY

One embodiment, accordingly, provides a method and apparatus for a bottom cable including several spaced apart hydrophones and an acoustic source in a moving surface vessel capable of sending an acoustic signal to the near hydrophones. To this end, a seismic ocean bottom positioning device comprises a plurality of seismic stations spaced apart at intervals along a cable. Each station includes a hydrophone, a motion detector device and an acoustic positioning circuit. A seismic channel is coupled to the hydrophone and an acoustic channel is coupled to the hydrophone.

A principal advantage of this embodiment is that the system uses one positioning sound from a single source to precisely locate multiple receivers in a stationary position on the ocean floor.

BRIEF DESCRIPTION OF DRAWINGS

FIG. 1 is a diagrammatic view illustrating an embodiment of a seismic ocean bottom cable system.

FIG. 2 is a diagrammatic view illustrating an embodiment of an integrated sensor module.

FIG. 3 is a diagrammatic view illustrating an embodiment of a common hydrophone and preamplifier coupled to a seismic channel and an acoustic positioning channel.

DETAILED DESCRIPTION OF THE PREFERRED EMBODIMENT

In FIG. 1, an acoustic signal 10a is sent out from a moving shooting boat 10 on a surface 11 of ocean 12 by an acoustic source 13. An air gun array 21 is towed behind boat 10 and produces a seismic signal for a seismic survey which may be conducted simultaneously in the well-known manner. Signals from the acoustic source 13 are received by sensors 14 attached to sections of a cable 15 at spaced apart intervals along the cable 15. Cable 15 is in a stationary position on a bottom 16 of ocean 12. The acoustic signals 10a pass directly through the water to the sensors 14, through some mud in the ocean bottom 16 to the sensors 14 and also by a short refracted path to the sensors 14. Each cable section is attached to an adjacent cable section by an electronic module 17. The senors 14 process the acoustic signal received and produce a seismic geophone signal and a seismic hydrophone signal. The acoustic signal processed by sensors 14 indicates the time that the acoustic signal was received. The two seismic signals and the acoustic signal data are sent from the sensor 14 to an adjacent module 17. The module 17 filters and formats the signals and sends them to an adjacent module 17. The module closest to a recording boat 18, in a stationary position on the surface 11, sends the signals to the recording boat 18 which gathers and records the data for later processing. Each sensor 14, FIG. 2, comprises an integrated sensor module 19 which includes a hydrophone 20, exposed to ambient underwater pressure, a suitable motion sensor which may be a vertical, gimbal mounted geophone 22, and acoustic positioning circuitry 24, each of which are sealed off from ambient underwater pressure.

The acoustic positioning circuitry 24 is distributed on PC boards in module 19. The circuitry is diagrammatically illustrated in FIG. 3, wherein common hydrophone 20 is used in connection with a seismic channel 28 and an acoustic positioning channel 30. In addition, a common preamplifier 32 is used in connection with the seismic channel 28 and the acoustic positioning channel 30. The seismic channel 28 includes a slew limiter 28a, an optional low-cut filter 28b, an analog to digital converter 28c and a decimation filter 28d. The acoustic positioning channel 30 includes a high pass filter 30a, an acoustic amplifier 30b and a signal detector 30c. Slew limiter 28a prevents high frequency folding in an analog-to-digital converter. The low cut filter 28b is optional and functions to get rid of low frequencies if so desired. The analog-to-digital converter 28c functions in the well-known manner. The decimation filter 28d functions to produce a binary digital word representing the amplitude of the seismic signal at a specific time. The high pass filter 30a functions to attenuate a low frequency signal out of the acoustic channel. The acoustic amplifier 30b functions to bring signals to a level suitable for detection. The signal detector 30c detects signals received from acoustic amplifier 30b.

Ordinarily, acoustic channel frequencies operate in the range of from about 40 kHz to more than 100 kHz. In the present embodiment, the acoustic channel frequency operates below 40 kHz in order to get some penetration into the mud at the ocean bottom 16. This penetration allows the acoustic signal to penetrate to the sensor which is dropped from the ocean surface 11 to the ocean bottom 16 and may penetrate into sediments such as mud on the ocean bottom 16. The use of frequencies that are too low will allow the acoustic signal to travel too far in the bottom sediments, and due to refraction, may arrive before the direct path. Another reason to exclude the low frequency is the noise generated by any boats that are nearby. It is clear that the optimum frequency is a compromise between the refraction problem and the boat noise problem. If the optimum frequency is too high, it will not reach a buried sensor. Unfortunately, the optimum frequency will probably vary with the bottom conditions from site to site.

It is therefore desirable to use one band of frequencies all of the time because seismic bottom cable crews continuously move from one location to another. The use of a single frequency simplifies the hardware but multiple frequencies may be used to enhance the operation.

In order to reject boat noise, a signal switches between two frequencies and a pulse pattern is used which enhances noise and multipath rejection. The frequencies chosen are within the capabilities of commonly used transmitters and transducers, and below the resonant frequency of the hydrophone 20.

The acoustic frequencies used are 13 kHz and 17 kHz and are a compromise for purposes of this system. This technique will also have application in acoustic streamer positioning. The use of a pulse pattern avoids well known notch and multipath problems in transmission and assists in rejecting noise. Different pulse patterns are used to minimize interference from other crews operating nearby, e.g. within 10 kilometers or less. This differs from presently known methods which send pulses of different frequencies and which use a frequency detector for each pulse. In the instant embodiment, two frequencies are used and transitions are made between frequencies at a rapid rate (63 possible frequency changes in 16 milliseconds) to provide a unique pattern that has a broad spectrum, so that a zero present in the spectrum, is not a problem. The long duration of the pulse pattern contains more energy than shorter, more powerful pulses. The received signal is correlated against a known code to extract the travel time from the source to the receiver. It is expected that a time accuracy of less than 100 microseconds will be attained by the use of differential GPS time at both the acoustic transmitter 13 and the central electronics 26 which control the acoustic sensors 14. This embodiment uses a long string of shifting frequencies and uses a correlation to collapse the pulse to determine the arrival time.

This embodiment describes a bottom cable 15 provided to locate the position of each hydrophone 20 on the ocean bottom 16. A common hydrophone and a common preamplifier are each used for both the seismic and acoustic signals. The two signals, seismic and acoustic, which have substantially different frequencies, are separated after the input stage and are conditioned and processed separately.

The acoustic source 13 is positioned on the ocean surface 11, by the use of GPS and the system measures the time from the acoustic source 13 to the sensors 14. The source position changes constantly so each sensor 14 distance is measured many times from different directions and distances. This permits the location of the sensors 14 in x and y coordinates as well as a z coordinate for the depth of the water.

The source boat 10 tows the seismic source 21 behind it, including an air gun array which also includes a GPS receiver 23. The source boat 10 also has a GPS receiver 25, the position of which is known with relation to the acoustic source 13. The acoustic source 13 may be towed, installed through the boat hull, as illustrated, or may be on a pole that is placed over the side of the boat 10. The depth of the sensors 14 is known except for the variation due to the rolling motion of the source boat 10.

As it can be seen, a principal advantage of this embodiment is that the system uses one positioning sound from a single source to precisely locate multiple receivers in a stationary position on the ocean floor. Bottom cable acquisition provides higher quality data because the sensors are stationary avoiding noise inherent in towed streamers. Data acquisition speed and accuracy are also improved and a reduced amount of equipment is required. Therefore, there are noticeable cost benefits.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A seismic ocean bottom positioning system comprising:

a single acoustic transmitter supported on a first moving ocean surface vessel;

a plurality of acoustic receiver units and modules spaced apart at intervals along a cable on the ocean bottom;

a first GPS receiver on the surface vessel;

a second GPS receiver operating from the first surface vessel, the position of the second GPS receiver being known with relation to the acoustic transmitter;

each receiver unit including a hydrophone, at least one geophone and an acoustic positioning circuit;

a seismic channel coupled to the hydrophone; and an acoustic channel coupled to the hydrophone;

the receiver units being at an unknown depth with relation to the acoustic transmitter; and a second stationary surface vessel receiving data from the receiver units and the modules.

2. The system as defined in claim 1 further comprises a preamplifier, the seismic channel coupled to the preamplifier and the acoustic channel coupled to the preamplifier.

3. A method of processing acoustic data for locating an acoustic receiver positioned on an ocean bottom comprising the steps of:

sending acoustic signals from a first surface vessel moving on a surface of a body of water;

receiving the acoustic signals in a stationary sensor unit including a seismic channel and an acoustic channel each coupled to a common hydrophone and a common preamplifier;

processing the acoustic signals in a module adjacent each sensor unit; and sending data from the processed signals to a second surface vessel in a stationary position on the surface of the body of water.

4. A sensor module for use in a marine seismic acquisition system, comprising:

a hydrophone;

a geophone operably coupled to the hydrophone; and an acoustic positioning circuit operably coupled to the hydrophone including:

a preamplifier operably coupled to the hydrophone;

a seismic channel for processing seismic signals operably coupled to the preamplifier including:

a slew limiter;

a low pass filter;

an analog-to-digital converter; and a decimation filter; and an acoustic positioning channel for processing acoustic signals operably coupled to the preamplifier including:

a high pass filter;

an acoustic amplifier; and a signal detector.

5. A positioning device for use in a marine seismic acquisition system, comprising:
a plurality of receiver stations spaced apart at intervals along a cable, each station including:
at least one hydrophone;
at least one geophone operably coupled to the hydrophone; and
an acoustic positioning circuit operably coupled to the hydrophone including:
preamplifier operably coupled to the hydrophone;
a seismic channel for processing seismic signals operably coupled to the preamplifier including:
a slew limiter;
a low pass filter;
an analog-to-digital converter; and
a decimation filter; and
an acoustic positioning channel for processing acoustic signals operably coupled to the preamplifier including:
a high pass filter;
an acoustic amplifier; and
a signal detector.

6. A marine seismic acquisition system, comprising:
a seismic source;
an acoustic source; and
a sensing system operably coupled to the seismic and acoustic sources including:
a plurality of receiver stations spaced apart at intervals along a cable, each station including:
at least one hydrophone;
at least one geophone operably coupled to the hydrophone; and
an acoustic positioning circuit operably coupled to the hydrophone including:
a preamplifier operably coupled to the hydrophone;
a seismic channel for processing seismic signals operably coupled to the preamplifier including:
a slew limiter;
a low pass filter;
an analog-to-digital converter; and
a decimation filter; and
an acoustic positioning channel for processing acoustic signals operably coupled to the preamplifier including:
a high pass filter;
an acoustic amplifier; and
a signal detector.

7. The method of claim 3, wherein the acoustic signals are transmitted as a pattern of pulses.

8. The method of claim 3, wherein the acoustic signals are transmitted at two frequencies.

9. The method of claim 3, wherein the acoustic signals are transmitted at frequencies less than about 40 kHz.

10. The method of claim 3, wherein the acoustic signals provide a frequency shift keying signal.

11. The method of claim 3, wherein the acoustic signals are correlated against a predetermined code to determine the travel time of the acoustic signals.

* * * * *